United States Patent [19]
Gee

[11] Patent Number: 5,890,248
[45] Date of Patent: Apr. 6, 1999

[54] FOOTWEAR AND THE MANUFACTURE THEREOF

[75] Inventor: Harry Howard Gee, Wellingborough, England

[73] Assignee: White & Co. (Earls Barton) Limited, England

[21] Appl. No.: 809,694

[22] PCT Filed: Sep. 7, 1995

[86] PCT No.: PCT/GB95/02102

§ 371 Date: Jun. 19, 1997

§ 102(e) Date: Jun. 19, 1997

[87] PCT Pub. No.: WO96/07536

PCT Pub. Date: Mar. 14, 1996

[30] Foreign Application Priority Data

Sep. 9, 1994 [GB] United Kingdom ............... 9418191
Jan. 14, 1995 [GB] United Kingdom ............... 9500724

[51] Int. Cl.⁶ ............................ A43D 9/16; B29D 31/508
[52] U.S. Cl. ............................ 12/146 B; 36/28; 36/30 A; 36/12
[58] Field of Search ................... 36/28, 25 R, 30 A, 36/31, 32 A, 154, 88, 93, 37, 12, 14; 12/146 B, 142 RS

[56] References Cited

U.S. PATENT DOCUMENTS

| | | | |
|---|---|---|---|
| 2,794,270 | 6/1957 | Dubner | 36/154 |
| 3,447,251 | 6/1969 | Drexler | 36/14 |
| 3,812,604 | 5/1974 | Sate | 36/14 |
| 3,852,895 | 12/1974 | Funck | 12/142 RS |
| 3,873,656 | 3/1975 | Garner | 264/55 |
| 4,245,406 | 1/1981 | Landay et al. | 36/14 |
| 4,399,620 | 8/1983 | Funck | 36/32 R |
| 4,651,444 | 3/1987 | Ours | 36/93 |
| 5,032,330 | 7/1991 | Auberry et al. | 264/46.5 |
| 5,667,738 | 9/1997 | Krajcir | 264/45.5 |

FOREIGN PATENT DOCUMENTS

| | | |
|---|---|---|
| 0048965 | 10/1980 | European Pat. Off. . |
| 0018663 | 12/1980 | European Pat. Off. . |
| 2180244 | 10/1973 | France . |
| 1126535 | 9/1968 | United Kingdom . |
| 2255308 | 4/1992 | United Kingdom . |

*Primary Examiner*—M. D. Patterson
*Attorney, Agent, or Firm*—Young & Basile, P.C.

[57] ABSTRACT

An item of footwear such as a shoe comprises an outer sole which may include an intermediate mid sole, an upper having an insole with a cavity between the outer sole or mid sole. The cavity receives injected into it cushioning resilient foam material which may extend into a heal portion of or to the outer sole of a multi-layer sole and heel unit. In the method of manufacture and after the assembly of the shoe with the empty cavity, the resilient material is subsequently injected into the cavity e.g. through a small bore in the outer sole or elsewhere. Vent hole enable air to escape from the cavity to ensure full and intimate filling of the cavity with the foam material. The upper may be retained on a last during injection to maintain a desired profile of the insole. Quantity and/or pressure of the injected material may be varied for obtaining different degrees of cushioning.

11 Claims, 1 Drawing Sheet

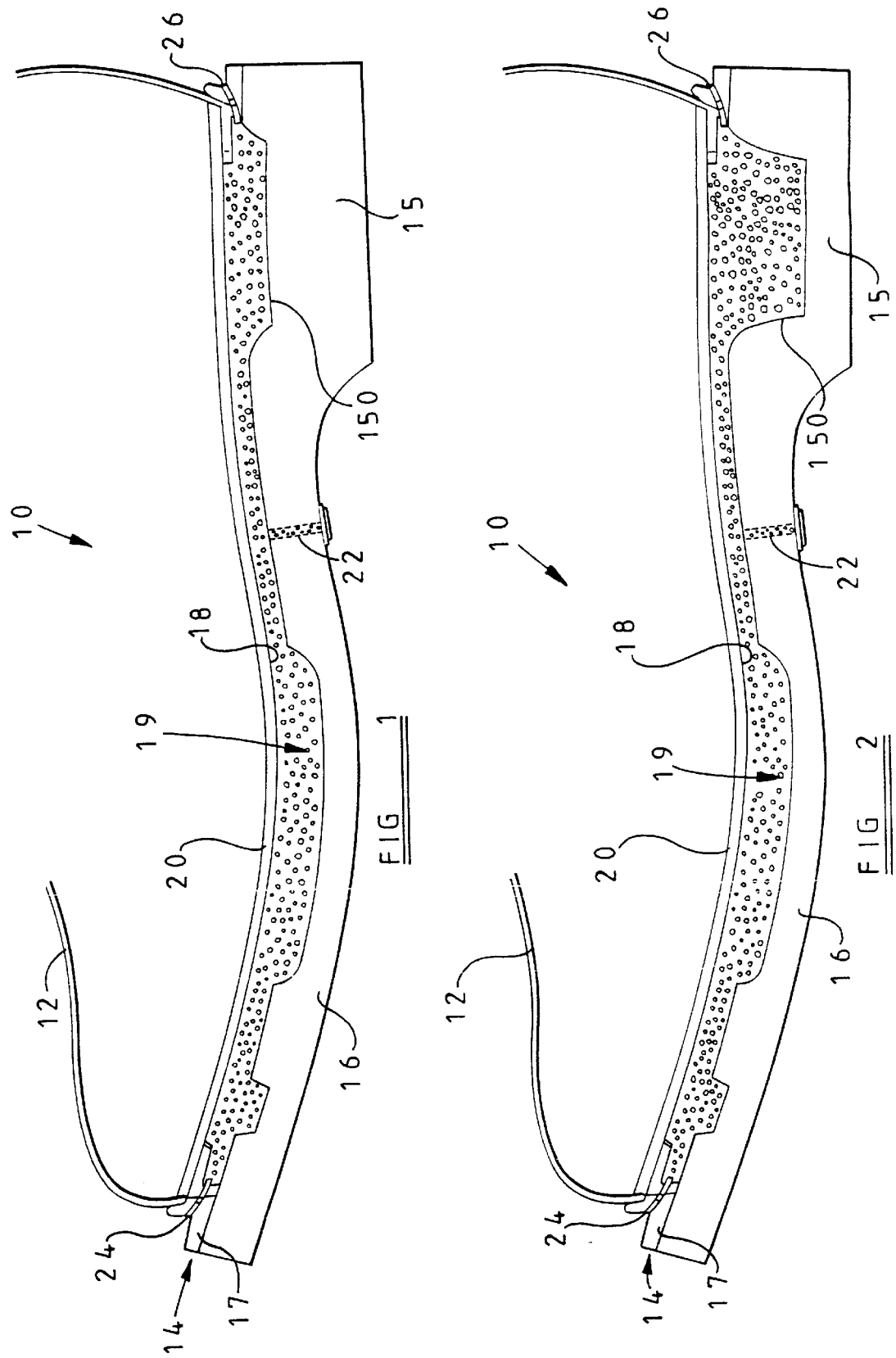

FOOTWEAR AND THE MANUFACTURE THEREOF

BACKGROUND OF THE INVENTION

This invention relates to footwear such as shoes.

Some shoe designs have a cavity between the outer sole and the shoe upper which normally contains a piece of synthetic material placed in the cavity during manufacture of the shoe. Whilst providing some cushioning for the wearer, the synthetic piece does not always effectively extend throughout the outer sole such as into the heel portion of the shoe and since it is a discrete piece of material it is not possible to vary the cushioning effect in a range of shoes.

EP-A-0 018 663 describes a method of making an athletic shoe in which an upper and a preformed rubber outsole are secured together by a foamed polyurethane midsole which is injected between the two. This bonds the outsole and the upper together.

EP-A-0 048 965 discloses a padded shoe sole having orthopedic properties which consists of a wear-resistant lower walking sole layer and a flexible upper padded layer of light-weight foam. Either the walking sole layer or the upper padded layer is foam-filled in a mold and allowed to cure. The other layer is then foam-filled into the mold for curing and bonding to the first layer. The walking sole layer is bonded to the shoe upper by the upper padded layer.

U.S. Pat. No. 3,812,604 discloses a shoe which has an instep bonded to a bottom layer by an intermediate layer. The bottom layer and instep are positioned in a mold and the intermediate layer in a liquid form is flowed into the spaces between the bottom layer and the instep. The intermediate layer is cooled and bonds the bottom layer and the instep together.

SUMMARY OF THE INVENTION

The present invention seeks to provide an improved item of footwear and a method of manufacturing such an item of footwear.

The present invention provides an item of footwear such as a shoe comprising an outer sole and heel unit and an upper having an insole, and at least one cavity between the outer sole and heel unit and insole having inserted therein by injection a resilient material which provides cushioning between the outer sole and heel unit and insole;

wherein said outer sole and heel unit and said upper are secured together to provide said item of footwear prior to injection of said resilient material into said at least one cavity.

The invention also provides a method of manufacturing an item of footwear such as a shoe comprising: providing an outer sole and heel unit and an upper having an insole; assembling said item of footwear by securing said outer sole and heel unit to said upper thereby to form at least one empty cavity between said outer sole and heel unit and said insole of said upper; and subsequent to said assembly, injecting into said at least one cavity a resilient material thereby to provide cushioning between said outer sole and heel unit and said insole.

In a preferred form of the invention the material is a synthetic material, preferably a plastics foam.

BRIEF DESCRIPTION OF THE DRAWINGS

The present invention is further described hereafter, by way of example, with reference to the accompanying drawings wherein:

FIG. 1 is a longitudinal section through a preferred form of a shoe according to the present invention; and FIG. 2 is another longitudinal section through the shoe.

DESCRIPTION OF THE PREFERRED EMBODIMENT

Referring to the drawings, there is shown a shoe 10 having a shoe upper 12 of leather or synthetic material secured to a multi-layered sole and heel unit 14. The assembly has an outer sole and heel unit formed by an outer sole 16 and a heel 15 of resilient, lightweight synthetic material, an intermediate layer or mid sole 17 which may or may not be integral with the outer sole and heel unit, and an insole 20. In the illustrated embodiments the intermediate layer 17 has a cavity 18 extending the full length of the shoe from the toe portion to the heel portion between the outer sole 16 (or mid sole 17) and the insole 20. Normally, during manufacture of the shoe a discrete piece or pieces of a resilient material such as a synthetic foam would be inserted into the cavity in order to provide some cushioning effect for the user. However, in the preferred process according to the present invention, during manufacture of the shoe the cavity 18 is left empty. Then, once assembly of the shoe has been completed, i.e., after the outer sole 16 and heel unit 15 is attached to the upper 12, a synthetic foam material 19 is subsequently injected under pressure into the cavity 18 to fill the whole of the cavity from the toe portion to the heel portion of the shoe. The synthetic material is conveniently injected through a small bore 22 which extends through the outer sole 16. Air which is trapped in the cavity 18 is allowed to escape through breather holes 24 and 26 to enable the synthetic material to fully and intimately fill the whole of the cavity.

The cavity 18 and foam material 19 are shown extending into a recess 150 in the heel 15 which recess is further shown of extended depth in FIG. 2.

The shoe is conveniently retained on a last or other support for the insole 20 during injection, the last serving to maintain the desired profile of the insole of the shoe.

The pressure injection of, for example, a reactive, high resilience chemical foam into the cavity 18 is particularly suited to Goodyear welted footwear. It is also suited to other construction methods of manufacture where units (i.e., the combined heel and sole) have a cavity in the fore part waist and heel as shown. Variation of the quantity of synthetic material injected and/or the pressure at which the material is injected allows the cushioning effect of the material to be varied easily, enabling a range of footwear providing different cushioning to be produced. By injecting a synthetic foam material one can ensure that the whole of the cavity 18 is filled by the material to provide a full cushioning effect between the outer sole and the insole.

Injection can be effected using, for example, specialist low pressure metering apparatus. In trials, a mixture of base resin and hardening agent (typically Diphenylmethane 4,4' Di-isocyanate) at a ratio of 3:1 was injected into the cavity 18 of a shoe at ambient temperature. Table I below sets out the details of the quantities used to inject five different shoes, all of which provided a noticeable improvement in comfort in the footwear. Ideally, a foam density of 0.2–0.3 g/cm is employed. The mix used also resulted in a "skin" forming on the outside of the injected material, this skin restricting water penetration into the body of the foam material.

TABLE I

| Injected Material Weight(g) | Injection Rate (g/sec) | Injection Time |
|---|---|---|
| 60 | 14.5 | 4.2 |
| 65 | 14.5 | 4.5 |
| 70 | 14.5 | 4.8 |
| 75 | 14.5 | 5.2 |
| 80 | 14.5 | 5.5 |

Although the bore 22 is described as being provided in the outer sole 16, it will be appreciated that the synthetic material can be injected into the cavity at any convenient location, for example through the shoe insole 20.

I claim:

1. A method of manufacturing an item of footwear such as a shoe comprising:

providing a bottom structure defined by an outer sole and heel unit and an upper having an insole;

assembling said item of footwear by securing said bottom structure to said upper thereby to form at least one empty cavity between said bottom structure and said insole of said upper;

and subsequent to said assembly, injecting into said at least one cavity a resilient material thereby to provide cushioning between said bottom structure and said insole.

2. A method according to claim 1 wherein the injection of the resilient material into said at least one cavity is such that the resilient material fully and intimately extends throughout the cavity.

3. A method according to claim 1 wherein the upper is retained on a last during injection of the resilient material into said at least one cavity, the last serving to maintain a desired profile of the insole.

4. A method according to claim 1 wherein the resilient material is a foam, after injection into the said at least one cavity.

5. A method according to claim 4 wherein the foam density of the resilient material is or the order of 0.2 to 0.3 g/cm.

6. A method according to claim 4 wherein the resilient material has the property of forming a skin thereabout after injection into the said at least one cavity, wherein said skin resists water penetration into the body of the resilient material.

7. A method according to claim 1 further comprising the step of injecting the resilient material into said at least one cavity through a small bore in at least one of the bottom structure and the insole.

8. A method according to claim 1 further comprising the step of providing at least one vent hole to the said at least one cavity through the bottom structure to allow escape of air which would otherwise be trapped in the cavity and so permit full and intimate filling of the latter by the resilient material.

9. An item of footwear produced by the method of claim 1, said item of footwear comprising a bottom structure defined by an outer sole and heel and an upper having an insole, and at least one cavity between the bottom structure and the insole, the at least one cavity having inserted therein by injection a resilient material which provides cushioning between the bottom structure and the insole;

wherein said bottom structure and said upper are secured together and at least one of said bottom structure and said insole has a bore through which said resilient material is injected into said at least one cavity.

10. An item of footwear according to claim 1 wherein the resilient material is a foam.

11. An item of footwear according to claim 1 wherein the heel is internally recessed to receive the injected resilient material between it and the insole.

* * * * *